May 30, 1939.   B. MARCELLUS   2,160,024
WARPER APPARATUS
Original Filed Nov. 2, 1935

INVENTOR
Brooks Marcellus
BY
ATTORNEYS

Patented May 30, 1939

2,160,024

UNITED STATES PATENT OFFICE 2,160,024

WARPER APPARATUS

Brooks Marcellus, Rockford, Ill., assignor to Barber-Colman Company, Rockford, Ill., a corporation of Illinois Original application November 2, 1935, Serial No. 47,919. Divided and this application April 7, 1938, Serial No. 200,617

2 Claims. (Cl. 33—132)

The present application is a division of my prior application Serial No. 47,919 filed November 2, 1935.

For an understanding of the environment in which warper clocks are used and the practical conditions which they must fulfill, reference may be made to Peterson patent, No. 1,747,734 and particularly to page 1, lines 1–22, and page 3, lines 44–77.

The primary function of a warper clock is to effect stoppage of the warper when a predetermined length of yarn has been wound upon the warp beam or "log". The latter is rotated through frictional contact of the yarn mass on the beam or log with the periphery of the driving drum of the warper. The clock is driven, not directly by the yarn which it purports to measure, but through a positive gear connection with the drum. The "measuring" of the yarn therefore actually consists in registering the number of revolutions of the drum in terms of yardage of yarn.

In the manufacture of warpers, slight variations in the diameter of the drums is inevitable. Even a slight difference between the diameters of the drums of two warpers would make an appreciable difference in the length of yarn on the beams wound on the respective warpers, since the beams usually contain many thousands of yards of yarn. In the construction disclosed in the above-mentioned Peterson patent, the clock unit comprised a change gear train by means of which the speed of the clock can be adjusted to register the revolutions of the warper drum in terms of yards of yarn on the beam. If the clock were moved from one warper to another, the gear train had to be adjusted to compensate for the difference in drum diameters.

The object of the present invention is to obviate the necessity for such readjustment.

Further objects and advantages of the invention will become apparent as the following description proceeds taken in connection with the accompanying drawing in which.

In carrying out the invention the speed change gear train forms a part of the warper rather than the clock unit and is adjusted to have a predetermined speed ratio between its power take-off shaft and the peripheral speed of the drum so that any clock may be placed on any warper of a series without loss of accuracy in the measurement of the yarn.

Figure 1:
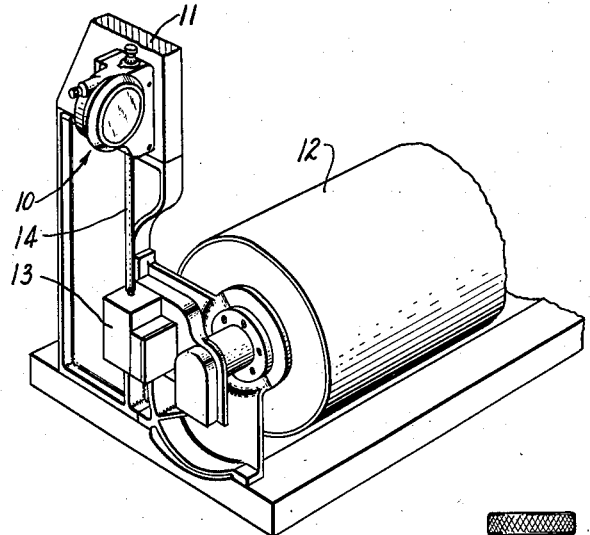
Figure 1 is a fragmental perspective view of a beam warper equipped with a clock in accordance with the present invention.
Figure 2:
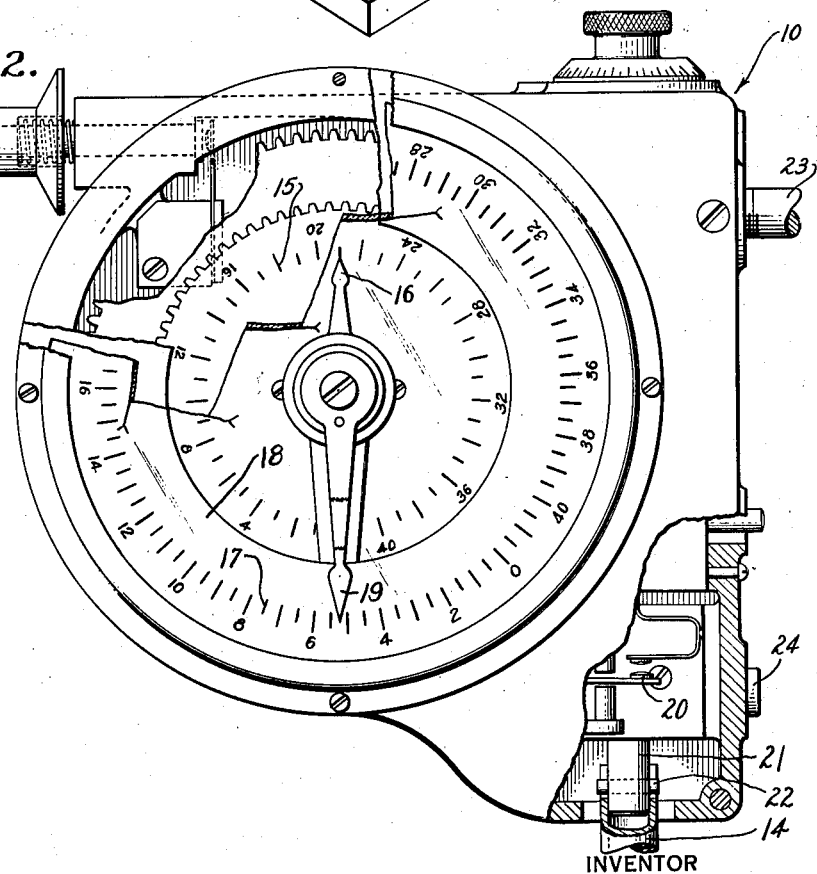
Fig. 2 is a front elevation of the clock, with parts broken away, the clock pointer having made approximately a third of a revolution from the starting position.

In the particular embodiment of the invention selected for purposes of illustration of its various novel features, a warper clock designated generally by the numeral 10 (Fig. 1) has been shown as detachably mounted on a fixed frame 11. This clock is driven from the associated friction driving drum 12 through a change speed gear train housed in a gear casing 13 and a vertical drive shaft 14. Any suitable form of speed change device may be used. For example, the speed change gearing may be of the general form illustrated in Fig. 2 of said Peterson patent, No. 1,747,734. As shown in Fig. 2 of such patent the speed change gearing embodies a change gear 7 meshing with a spur gear 6 and a change gear 10, the change gear 7 being carried by an adjustable bracket 8. With such an arrangement to change the speed of the output shaft, to which the change gear 10 is keyed, with respect to the input shaft 3, it is only necessary to substitute change gears 7 and 10 of different sizes. In the present structure such a change speed gearing can be used with a warper beam connected to the input shaft 3 and the clock driving shaft connected to the shaft which supports the change speed gear 10. Alternatively the change speed gear or device may be of a conventional expansible pulley type shown, for example, in "Machinery Encyclopedia", Vol. VI, page 426. As is explained more in detail in the latter publication the speed ratio between two shafts is changed by expanding or contracting the pulleys by which they are belt connected. In either case the speed change device gives a wide range of variation in the ratio of angular velocities between the input and output shafts. The change speed gear train in the casing 13 herein may be adjusted in the case of each warper so that the angular velocity of the take-off or driving shaft 14 bears a predetermined fixed relation to the peripheral speed of the drum 12. This predetermined relation is made standard for all machines using the clocks of the type herein disclosed so that these clocks may be transferred from one warper to another without affecting their accuracy of registration despite variations in drum diameter. As a consequence, the removably mounted warper clocks are interchangeable between different machines and without the necessity of individual adjustment. This is particularly advantageous in view of the fact that the clocks are relatively expensive and complicated mechanisms so that it is desirable to utilize a minimum number of them for a series of intermittently operating warpers.

A detailed description of the clock mechanism is unnecessary for an understanding of the present invention. The particular clock mechanism shown is that disclosed in my copending application Serial No. 47,919 referred to above. In general, the warper clock shown serves to indicate a selected yardage of yarn to be wound on the warper as well as to give a continuous indication throughout the winding operation of the remaining amount of yarn which must be wound to reach the selected total. In the warper clock 10 (Fig. 2) a rotatable graduated dial 15 cooperates with a pointer 16 to indicate the selected total amount of yarn to be wound. Similarly a graduated dial 17 marked on the transparent bezel or cover 18 of the clock cooperates with a rotatable pointer 19 to indicate the yardage which must be wound to finish the selected total. In addition, the clock illustrated is provided with a switch mechanism including contacts 20 (Fig. 2) which are actuated when the selected total yardage of yarn has been wound to stop the warper.

Power for actuating the clock mechanism 10 is derived from the shaft 14 connected with a shaft 21 within the clock casing. As above indicated, the clock is removably mounted on the frame 11 and to permit of removal from its operative position on any given warper a detachable connection is provided within the shaft 14 of the warper and the shaft 21 of the clock. In the present instance such a connection is provided by a transverse pin 22 on the shaft 21 which is received in a complemental slot or notch in the top of the shaft 14. The clock may be detachably mounted on the frame 11 in any suitable manner as, for example, by a screw 23 and locating dowel 24.

It will be seen that with the arrangement set forth the warper clock 10 may be used interchangeably on any one of a series of warpers without any adjustment in the mechanism of the clock to compensate for differences in diameter of the various drums. All such differences in drum diameter, which invariably occur in warpers, are taken care of by the adjustment of the associated speed-change gearing 13 in such manner as to provide a uniform speed relation between the clock driving shaft and drum periphery as described above.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

I claim as my invention:

1. A warper having, in combination, a friction drum to drive a yarn container, speed-reduction change gearing mounted on the warper and driven with the drum, said gearing including a driven member adapted to be rotated at an angular velocity bearing a predetermined ratio to the peripheral speed of said drum upon proper initial adjustment of said change gearing, and a warper clock detachably mounted on the warper and having a detachable connection to said driven member to drive the clock, whereby said clock may be utilized to register accurately the integrated peripheral speed of said drum irrespective of variations in drum diameter in different installations.

2. The combination of a warper, a speed-change device mounted on the warper and driven thereby, said device including a driven member adapted to be driven at a predetermined speed in relation to the warper speed upon proper initial adjustment of said speed change device, and a warper clock detachably mounted on the warper and having a detachable connection to said driven member to drive the clock, whereby said clock may be utilized with warper beams of different diameters without the necessity of adjustment of the clock to compensate for the differences in the ratio of angular velocity to peripheral speed for such beams in view of the predetermined standard speed of the speed-change driven member.

BROOKS MARCELLUS.